(12) United States Patent
Kim et al.

(10) Patent No.: US 11,769,483 B2
(45) Date of Patent: *Sep. 26, 2023

(54) MULTILINGUAL TEXT-TO-SPEECH SYNTHESIS

(71) Applicant: NEOSAPIENCE, INC., Seoul (KR)

(72) Inventors: Taesu Kim, Suwon-si (KR); Younggun Lee, Seoul (KR)

(73) Assignee: NEOSAPIENCE, INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/533,459

(22) Filed: Nov. 23, 2021

(65) Prior Publication Data

US 2022/0084500 A1 Mar. 17, 2022

Related U.S. Application Data

(63) Continuation of application No. 16/682,390, filed on Nov. 13, 2019, now Pat. No. 11,217,224, which is a (Continued)

(30) Foreign Application Priority Data

| | | |
|---|---|---|
| Jan. 11, 2018 | (KR) | 10-2018-0004047 |
| Mar. 29, 2018 | (KR) | 10-2018-0036377 |
| Jan. 11, 2019 | (KR) | 10-2019-0003979 |

(51) Int. Cl.
*G06F 17/00* (2019.01)
*G10L 13/10* (2013.01)
(Continued)

(52) U.S. Cl.
CPC ............ *G10L 13/10* (2013.01); *G06F 40/40* (2020.01); *G06N 3/04* (2013.01); *G06N 3/044* (2023.01);
(Continued)

(58) Field of Classification Search
CPC ...................................................... G06F 17/28
See application file for complete search history.

(56) References Cited

U.S. PATENT DOCUMENTS

| | | |
|---|---|---|
| 9,922,641 B1 | 3/2018 | Chun |
| 2003/0135356 A1 | 7/2003 | Ying et al. |

(Continued)

FOREIGN PATENT DOCUMENTS

| | | | | |
|---|---|---|---|---|
| GB | 2572020 A | * | 9/2019 | ............. G06F 40/58 |
| JP | 2004287444 A | | 10/2004 | |

(Continued)

OTHER PUBLICATIONS

International Search Report for PCT/KR2019/000509 dated Apr. 9, 2019.

(Continued)

*Primary Examiner* — Shreyans A Patel
(74) *Attorney, Agent, or Firm* — Dinsmore & Shohl LLP; Yongsok Choi, Esq.

(57) ABSTRACT

A multilingual text-to-speech synthesis method and system are disclosed. The method includes receiving an articulatory feature of a speaker regarding a first language, receiving an input text of a second language, and generating output speech data for the input text of the second language that simulates the speaker's speech by inputting the input text of the second language and the articulatory feature of the speaker regarding the first language to a single artificial neural network multilingual text-to-speech synthesis model. The single artificial neural network multilingual text-to-speech synthesis model is generated by learning similarity information between phonemes of the first language and phonemes of the second language based on a first learning data of the first language and a second learning data of the second language.

9 Claims, 15 Drawing Sheets

Related U.S. Application Data continuation of application No. PCT/KR2019/000509, filed on Jan. 11, 2019.

(51) Int. Cl.
  *G10L 13/033* (2013.01)
  *G10L 13/047* (2013.01)
  *G06N 3/04* (2023.01)
  *G06N 3/08* (2023.01)
  *G06F 40/40* (2020.01)
  *G10L 13/08* (2013.01)
  *G10L 25/30* (2013.01)
  *G06N 3/044* (2023.01)
  *G06N 3/045* (2023.01)

(52) U.S. Cl.
  CPC .............. *G06N 3/045* (2023.01); *G06N 3/08* (2013.01); *G10L 13/033* (2013.01); *G10L 13/047* (2013.01); *G10L 13/086* (2013.01); *G10L 25/30* (2013.01)

(56) References Cited

U.S. PATENT DOCUMENTS

| | | | |
|---|---|---|---|
| 2004/0193398 A1 | 9/2004 | Chu et al. | |
| 2009/0055162 A1 | 2/2009 | Qian et al. | |
| 2011/0218804 A1 | 9/2011 | Chun | |
| 2012/0253781 A1* | 10/2012 | Qian | G10L 21/003 704/2 |
| 2012/0265518 A1 | 10/2012 | Lauder | |
| 2012/0278081 A1* | 11/2012 | Chun | G10L 13/033 704/E13.011 |
| 2014/0222415 A1 | 8/2014 | Legat | |
| 2015/0186359 A1* | 7/2015 | Fructuoso | G10L 25/30 704/8 |
| 2018/0330732 A1* | 11/2018 | Dasgupta | G06F 3/0484 |
| 2019/0087734 A1 | 3/2019 | Ide et al. | |
| 2019/0095430 A1* | 3/2019 | Smus | G06F 40/58 |
| 2019/0191224 A1* | 6/2019 | Newell | H04N 21/84 |
| 2020/0342852 A1 | 10/2020 | Kim et al. | |

FOREIGN PATENT DOCUMENTS

| | | | | |
|---|---|---|---|---|
| JP | 2006189544 A | * | 7/2006 | |
| JP | 2010237323 A | | 10/2010 | |
| JP | 2017032839 A | | 2/2014 | |
| KR | 1020090066106 A | | 6/2009 | |
| KR | 1020140120560 A | | 10/2014 | |
| WO | WO-9734292 A1 | * | 9/1997 | ......... G10L 15/1807 |
| WO | 2017168870 A1 | | 10/2017 | |

OTHER PUBLICATIONS

Younggun Lee, et al., "Learning Pronunciation from a Foreign Language in Speech Synthesis Networks," section 3, Oct. 22, 2018, URL: https://openreview.net/revisions?id=HkeYCNgooQ.

Huaiping Ming et al., A Light-weight Method of Building an LSTM-RNN-based Bilingual TTS System, International Conference on Asian Language Processing (IALP), IEEE, Dec. 5, 2017, pp. 201-204.

Younggun Lee, et al., "Emotional End-to-End Neural Speech Synthesizer," Journal, Nov. 15, 2017, The School of Electrical Engineering Korea Advanced Institute of Science and Technology, Daejeon, Korea & Department of Computer Science, Dolatabad Branch, Islamic Azad University, Isfahan, Iran.

Sercan Arik, et al., "Deep Voice 2: Multi-Speaker Neural Text-to-Speech" Journal of Computer Science, Computation and Language, May 24, 2017.

Javier Latorre, et al., "New Approach to the Polyglot Speech Generation by Means of an HMM-Based Speaker Adaptable Synthesizer," Speech Communication. vol. 48, Issue 10, pp. 1227-1243, section 4, Oct. 2006, URL: www.sciencedirect.com/science/article/pii/S0167639306000483.

Javier Latorre, et al., "New Approach to The Polyglot Speech Generation by Means of an HMM-Based Speaker Adaptable Synthesizer" Journal of Speech Communication; May 11, 2006; vol. 48; pp. 1227-1242.

Tatyana Polyakova, et al., "Main Issues in Grapheme-to-Phoneme Conversion for TTS," Procesamiento del Leuguaje Natural, 2005, pp. 29-34, section 2, Jan. 2005, URL: www.researchgate.net/publication/28166791_Main)issue_in_grapheme-to-phoneme_conversion_for_TTS.

* cited by examiner

| IPA | KoG2P phoneme | IPA | KoG2P phoneme |
|---|---|---|---|
| b | p0 | tɕ | cc |
| d | t0 | tɕʰ | ch |
| dz | c0 | tɕ | c0 |
| dʑ | c0 | tɕ͈ | cc |
| g | k0 | tɕʰ | ch |
| h | h0 | w | wa, wq, wv, we, wi |
| ɦ | h0 | z | s0 |
| j | ya, yq, yv, ye, yo, yu | ʑ | s0 |
| k | kf | a | aa |
| k͈ | kk | æ | aa |
| kʰ | kh | e | ee |
| l | ll | ɛ | ee |
| m | mf, mm | ə | qq |
| n | mn, nf | ɤ | qq |
| ŋ | ng | i | ii |
| p | pf | ɨ | ii |
| p͈ | pp | o | oo |
| pʰ | ph | ɔ | oo |
| r | rr | ɯ | we |
| s | s0 | ø | wo |
| s͈ | ss | u | uu |
| ɕ | s0 | ɯ | uu |
| ɕ͈ | ss | ʌ | vv |
| tɕ | tf | ɤ | vv |
| tʰ | th | ɰ | xx |
| tʰ | th | ɰɛ | xx |
| ts | c0 | ɰi | xi |

1120

| IPA | ENG | KOR |
|---|---|---|
| b | B | p0 |
| d | D | t0 |
| e | EH | qq |
| g | G | k0 |
| h | HH, H | h0 |
| i | IY | ii |
| j | Y | ya, yq, yv, ye, yo, yu |
| k | K | kf |
| l | L | ll |
| m | M | mf, mm |
| n | N | mn, nf |
| ŋ | NX, NG | ng |
| p | P | pf |
| ɾ | DX | rr |
| s | S | s0 |
| t | T | tf |
| u | UW | uu |
| ʌ | AH | vv |
| w | W | wa, wq, wv, we, wi |
| z | Z | s0 |

FIG. 12

| Korean phoneme | 1st | 2nd | 3rd | 4th | 5th |
|---|---|---|---|---|---|
| ii (i) | IY2 (i) | Y (j) | IY1 (i) | IY0 (i) | EY0 (eɪ) |
| k0 (g) | G (g) | B (b) | DH (ð) | W (w) | UH2 (ʊ) |
| kf (k) | NG (ŋ) | K (k) | UH2 (ʊ) | T (t) | P (p) |
| ll (l) | ER2 (ɝ) | ER0 (ɚ) | R (ɹ) | UH0 (ʊ) | OY0 (ɔɪ) |
| p0 (b) | B (b) | P (p) | M (m) | DH (ð) | AA0 (ɑ) |
| pf (p) | W (w) | T (t) | B (b) | M (m) | G (g) |
| qq (r) | EY0 (eɪ) | EY1 (eɪ) | EY2 (eɪ) | EH1 (ɛ) | AY0 (aɪ) |
| rr (r) | D (d) | UH2 (ʊ) | ER0 (ɚ) | AH0 (ʌ) | ER2 (ɝ) |
| t0 (d) | D (d) | TH (θ) | EH2 (ɛ) | V (v) | G (g) |
| tf (t) | T (t) | HH (h) | AO0 (ɔ) | N (n) | SH (ʃ) |
| uu (u) | OY2 (ɔɪ) | UW2 (u) | OY1 (ɔɪ) | UH2 (ʊ) | AO0 (ɔ) |
| vv (ʌ) | AO0 (ɔ) | AA1 (ɑ) | AA2 (ɑ) | AO1 (ɔ) | AA0 (ɑ) |

|  | TIME OF ENGLISH DATA USED | | | |
|---|---|---|---|---|
| CER | 10 | 5 | 3 | 1 |
| ENGLISH TEXT SET READ BY KOREAN SPEAKER | 22.5% | 26.9% | 35.6% | 39.9% |
| KOREAN TEXT SET READ BY ENGLISH SPEAKER | 12.5% | 12.9% | 7.9% | 11.1% |

MULTILINGUAL TEXT-TO-SPEECH SYNTHESIS

CROSS-REFERENCE TO RELATED APPLICATION

This application is a continuation of U.S. application Ser. No. 16/682,390 filed on Nov. 13, 2019, which is a continuation of International Application No. PCT/KR2019/000509 filed on Jan. 11, 2019, which claims priority to Korean Patent Application No. 10-2018-0004047 filed on Jan. 11, 2018, Korean Patent Application No. 10-2018-0036377 filed on Mar. 29, 2018, and Korean Patent Application No. 10-2019-0003979 filed on Jan. 11, 2019, the entire contents of which are herein incorporated by reference.

TECHNICAL FIELD

The present disclosure relates to a method and system for multilingual text-to-speech synthesis. The present disclosure also relates to a method and apparatus for synthesizing a speech of a speaker who uses a first language from a text of a second language based on the voice features of the speaker.

BACKGROUND ART

Generally, speech synthesis technology which is called text-to-speech (TTS) is a technology used to reproduce a necessary speech without pre-recording an actual human speech in an application requiring a human speech such as an announcement, navigation, artificial intelligence (AI) assistance, and the like. As a typical speech synthesis method, there are Concatenative TTS in which a speech is divided and stored in very short units such as phonemes and phonemes constituting a sentence to be synthesized are combined to synthesize a speech and Parametric TTS in which speech features are expressed by parameters and a speech corresponding to a sentence to be synthesized is synthesized from parameters expressing speech features constituting the sentence by means of a vocoder.

Recently, an artificial neural network-based speech synthesis method has been actively studied, and a speech synthesized according to this speech synthesis method shows much more natural speech features than those of conventional methods. However, in order to implement a speech synthesizer for a new voice using an artificial neural network-based speech synthesis method, a lot of data corresponding to the voice is required, and the re-training of the neural network model using this data is also required, thereby reducing user convenience.

SUMMARY

The method and apparatus according to the present disclosure are capable of generating a multilingual TTS machine learning model using only an input text (a text input) and output speech (an audio output) for a plurality of languages in an end-to-end manner. Also, the method and apparatus according to the present disclosure may synthesize a speech from a text by reflecting a speaker's articulatory feature, emotion feature, and prosody feature.

According to one embodiment of the present disclosure, a multilingual text-to-speech synthesis method includes: receiving first learning data including a learning text of a first language and learning speech data of the first language corresponding to the learning text of the first language; receiving second learning data including a learning text of a second language and learning speech data of the second language corresponding to the learning text of the second language; and generating a single artificial neural network text-to-speech synthesis model by learning similarity information between phonemes of the first language and phonemes of the second language based on the first learning data and the second learning data.

According to one embodiment of the present disclosure, the multilingual text-to-speech synthesis method further includes: receiving an articulatory feature of a speaker regarding the first language; receiving an input text of the second language; and generating output speech data for the input text of the second language that simulates the speaker's speech by inputting the input text of the second language and the articulatory feature of the speaker regarding the first language to the single artificial neural network text-to-speech synthesis model.

According to one embodiment of the present disclosure, in the multilingual text-to-speech synthesis method, the articulatory feature of the speaker regarding the first language is generated by extracting a feature vector from speech data that the speaker utters in the first language.

According to one embodiment of the present disclosure, the multilingual text-to-speech synthesis method further includes: receiving an emotion feature; and generating output speech data for the input text of the second language that simulates the speaker's speech by inputting the input text of the second language, the articulatory feature of the speaker regarding the first language, and the emotion feature to the single artificial neural network text-to-speech synthesis model.

According to one embodiment of the present disclosure, the multilingual text-to-speech synthesis method further includes: receiving a prosody feature; and generating output speech data for the input text of the second language that simulates the speaker's speech by inputting the input text of the second language, the articulatory feature of the speaker regarding the first language, and the prosody feature to the single artificial neural network text-to-speech synthesis model.

According to one embodiment of the present disclosure, in the multilingual text-to-speech synthesis method, the prosody feature includes at least one of information on utterance speed, information on accentuation, information on voice pitch, and information on pause duration.

According to one embodiment of the present disclosure, the multilingual text-to-speech synthesis method further includes: receiving an input speech of the first language; extracting a feature vector from the input speech of the first language to generate an articulatory feature of a speaker regarding the first language; converting the input speech of the first language into an input text of the first language; converting the input text of the first language into an input text of the second language; and generating output speech data of the second language for the input text of the second language that simulates the speaker's speech by inputting the input text of the second language and the articulatory feature of the speaker regarding the first language to the single artificial neural network text-to-speech synthesis model.

According to one embodiment of the present disclosure, in the multilingual text-to-speech synthesis method, the learning text of the first language and the learning text of the second language are converted into a phoneme sequence using a grapheme-to-phoneme (G2P) algorithm.

According to one embodiment of the present disclosure, in the multilingual text-to-speech synthesis method, the single artificial neural network text-to-speech synthesis model is generated without an input of similarity information on at least one of pronunciations and notations between phonemes of the first language and phonemes of the second language.

Further, a program for implementing the above-mentioned multilingual text-to-speech synthesis method may be record in a computer-readable storage medium.

DESCRIPTION OF DRAWINGS

FIG. 11 shows a correspondence between phonemes of International Phonetic Alphabet (IPA) and Korean grapheme-to-phoneme (KoG2P) and a correspondence between phonemes having common pronunciations of English and Korean.

FIG. 12 shows a table indicative of English phonemes that are the most similar to Korean phonemes.

FIG. 14 is a table illustrating a character error rate (CER) of English data used to train a TTS machine learning model over time.

DETAILED DESCRIPTION

Figure 1:
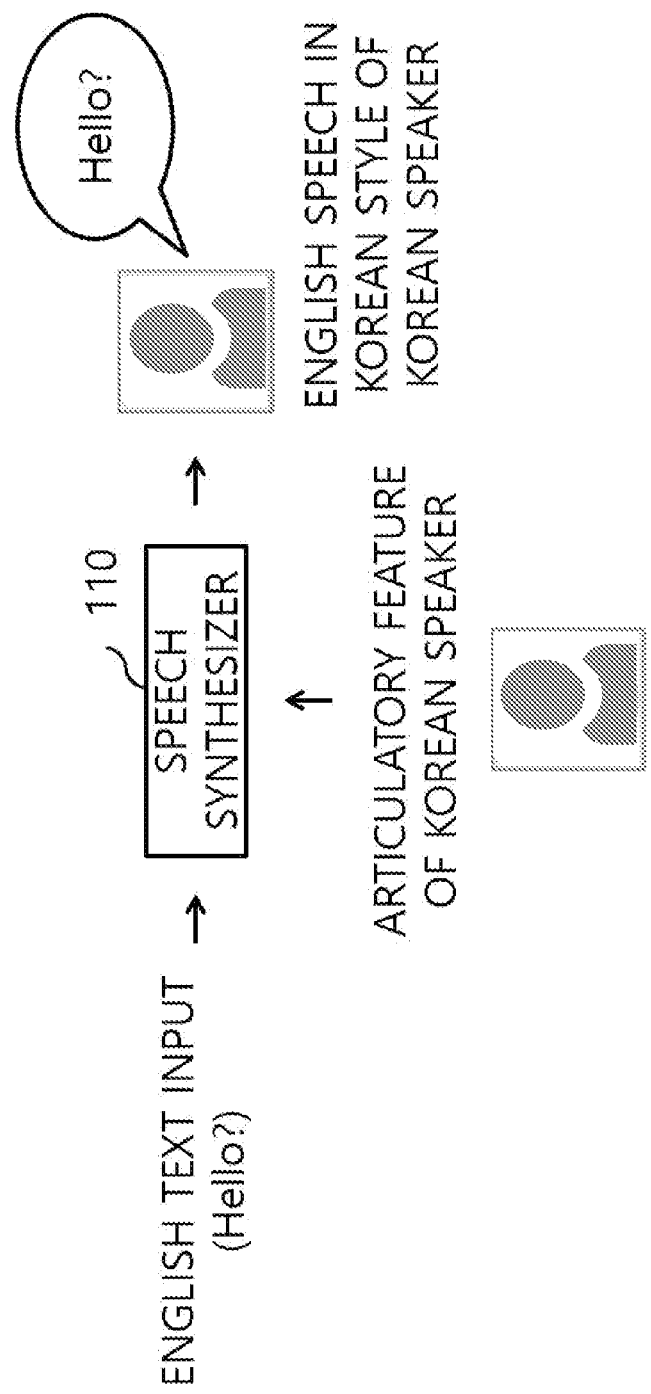
FIG. 1 is a diagram showing that a speech synthesizer synthesizes an English speech using a single artificial neural network text-to-speech synthesis model that learns about a plurality of languages.

Advantages and features of the disclosed embodiments and methods of accomplishing the same will be apparent by referring to embodiments described below in connection with the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art.

Terms used herein will be briefly described, and disclosed embodiments will be described in detail below.

The terms used herein have been selected as general terms which are widely used at present in consideration of the functions of the present disclosure, and this may be altered according to the intent of an operator skilled in the art, conventional practice, or introduction of new technology. Also, in a specific case, a term is arbitrarily selected by the applicant, and a meaning of the term will be described in detail in a corresponding description portion of the exemplary embodiments. Therefore, the terms used herein should be defined based on the overall content of the present disclosure instead of a simple name of each of the terms.

As used herein, the singular forms "a," "an," and "the" are intended to include the plural forms as well unless the context clearly indicates the singular forms. Also, the plural forms are intended to include the singular forms as well, unless the context clearly indicates the plural forms.

Furthermore, when one part is referred to as "comprising" (or "including" or "having") other elements, the part can comprise (or include or have) only those elements or other elements as well as those elements unless specifically described otherwise.

The term "unit" used herein denotes a software or hardware component, and the "unit" performs a specific role. However, the meaning of the "unit" is not limited to software or hardware. The "unit" may be configured to be in an addressable storage medium or to execute one or more processors. Accordingly, as an example, the "unit" includes elements such as software elements, object-oriented software elements, class elements, and task elements, processes, functions, attributes, procedures, subroutines, program code segments, drivers, firmware, micro-codes, circuits, data, database, data structures, tables, arrays, and variables. Furthermore, functions provided in the elements and the "units" may be combined as a smaller number of elements and "units" or further divided into additional elements and "units."

According to an embodiment of the present disclosure, the "unit" may be implemented as a processor or a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

According to the present disclosure, the term "first language" may refer to any one of various languages used in various countries or by various people, such as Korean, Japanese, Chinese, and English, and the term "second language" may refer to one of languages used in countries or by people other than those of the first language.

Hereinafter, exemplary embodiments will be fully described with reference to the accompanying drawings in such a way that those skilled in the art can easily carry out the embodiments. Further, in order to clearly illustrate the present invention, parts not related to the description are omitted in the drawings.

FIG. 1 is a diagram showing that a speech synthesizer 110 synthesizes an English speech using a single artificial neural network text-to-speech synthesis model that learns about a plurality of languages. In the shown example, the single artificial neural network text-to-speech synthesis model may learn Korean data and English data together. The speech synthesizer 110 may receive an English text and an articulatory feature of a Korean speaker. For example, the English text may be "Hello?" and the articulatory feature of the Korean speaker may be a feature vector extracted from speech data uttered by the Korean speaker in Korean.

The speech synthesizer 110 may input the received English text and the articulatory feature of the Korean speaker to the single artificial neural network text-to-speech synthesis model, simulate the Korean speaker's speech, and synthesize and output a speech saying "Hello?" in English. That is, the speech output by the speech synthesizer 110 may be a speech in which the Korean speaker pronounces "Hello?" in English.

Figure 2:
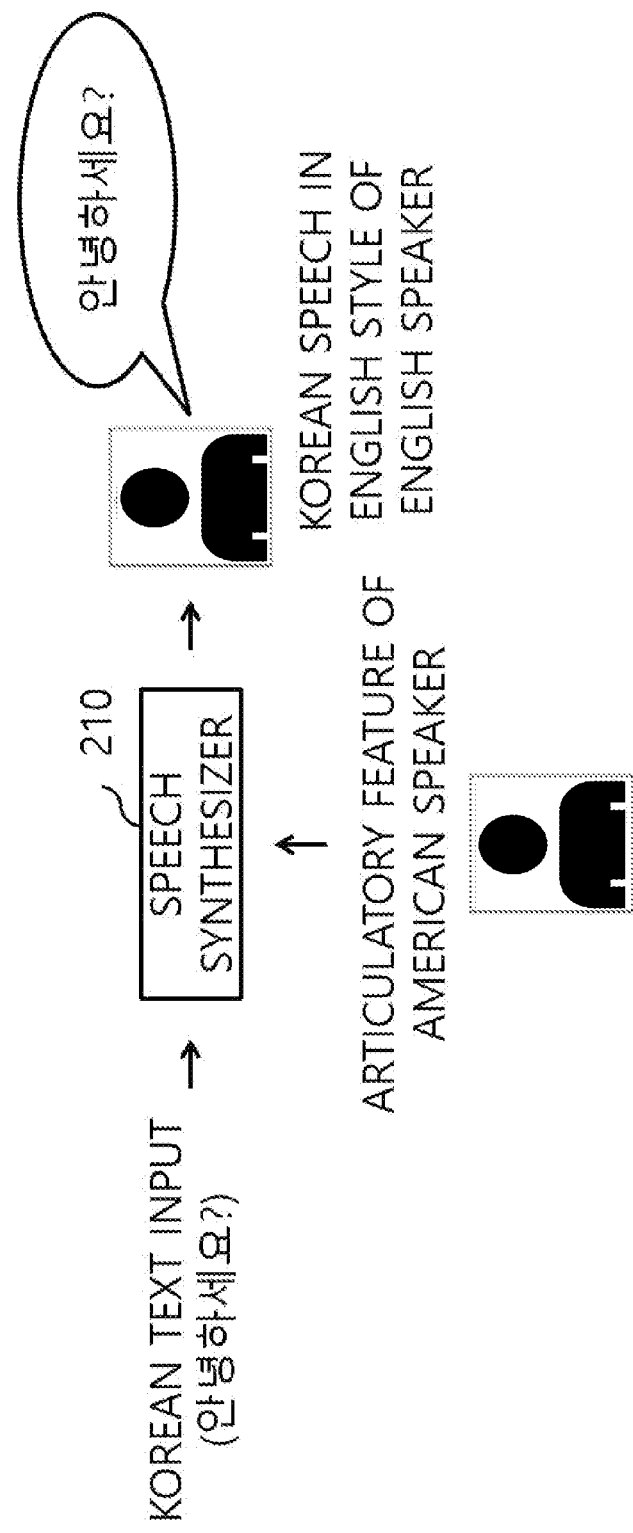
FIG. 2 is a diagram showing that a speech synthesizer synthesizes a Korean speech using a single artificial neural network text-to-speech synthesis model that learns about a plurality of languages.

FIG. 2 is a diagram showing that a speech synthesizer 210 synthesizes a Korean speech using a single artificial neural network text-to-speech synthesis model that learns about a plurality of languages. In the shown example, the single artificial neural network text-to-speech synthesis model may learn Korean data and English data together. The speech synthesizer 210 may receive a Korean text and an articulatory feature of an American speaker. For example, the Korean text may be "안녕하세요" and the articulatory feature of the American speaker may be a feature vector extracted from speech data uttered by the American speaker in English.

The speech synthesizer 210 may input the received Korean text and the articulatory feature of the American speaker to the single artificial neural network text-to-speech synthesis model, simulate the American speaker's speech, and synthesize and output a speech saying "안녕하세요" in Korean. That is, the speech output by the speech synthesizer 210 may be a speech in which the American speaker pronounces "안녕하세요" in Korean.

Figure 3:
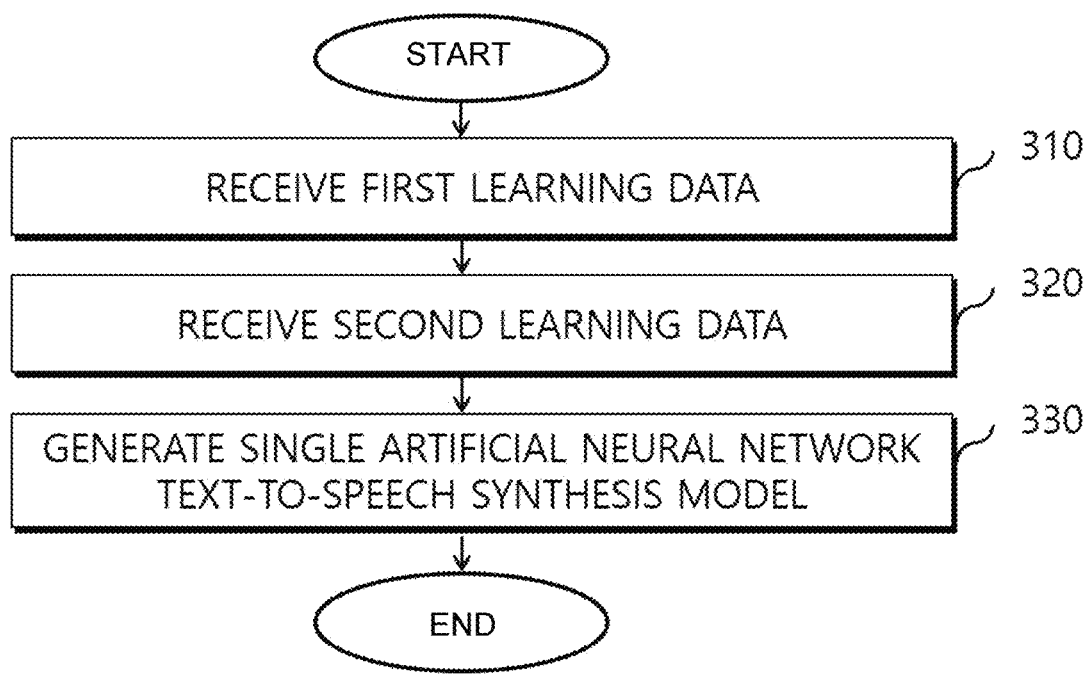
FIG. 3 is a flowchart showing a method of generating a single artificial neural network text-to-speech synthesis model according to an embodiment of the present invention.

FIG. 3 is a flowchart showing a method of generating a single artificial neural network text-to-speech synthesis model according to an embodiment of the present invention. A multilingual text-to-speech synthesis system may perform an operation 310 of receiving first learning data including a learning text of a first language and learning speech data of the first language corresponding to the learning text of the first language. The multilingual text-to-speech synthesis system may perform an operation 320 of receiving second learning data including a learning text of a second language and learning speech data of the second language corresponding to the learning text of the second language.

The multilingual text-to-speech synthesis system may perform an operation 330 of generating a single artificial neural network text-to-speech synthesis model by learning similarity information between phonemes of the first language and phonemes of the second language based on the first learning data and the second learning data. The method of generating a single artificial neural network text-to-speech synthesis model will be described in detail with reference to FIG. 4.

Figure 4:
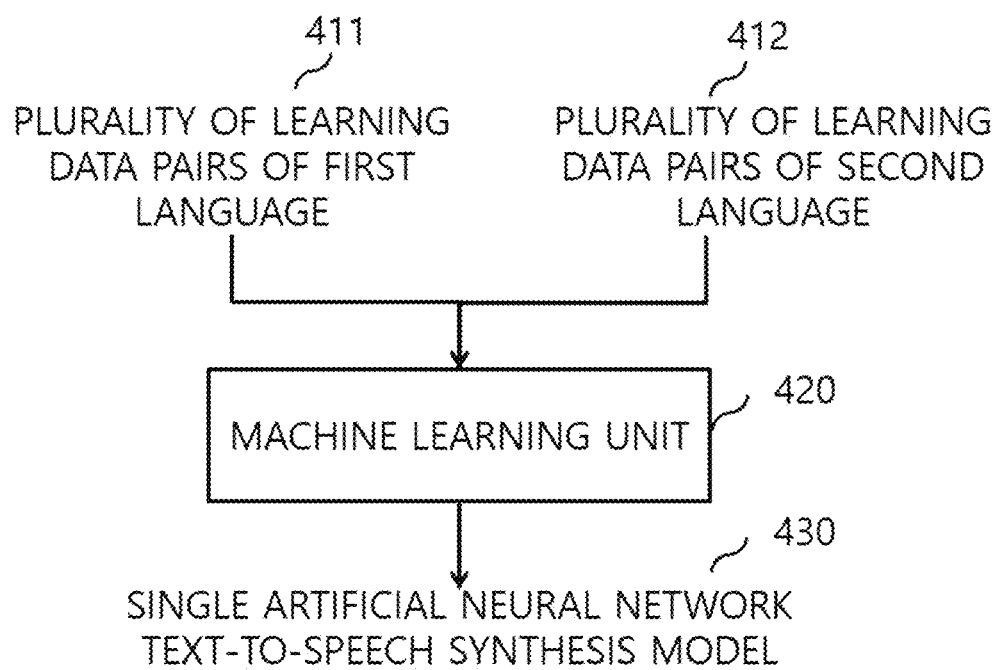
FIG. 4 is a diagram showing a machine learning unit according to an embodiment of the present disclosure.

FIG. 4 is a diagram showing a machine learning unit 420 according to an embodiment of the present disclosure. The machine learning unit 420 may correspond to a data learning unit 1510 of FIG. 15. The machine learning unit 420 may receive a plurality of learning data pairs 411 of a first language. Each of learning data pairs 411 of the first language may include a learning text of the first language and learning speech data of the first language corresponding to the learning text of the first language.

The learning text of the first language may include at least one character, and the machine learning unit 420 may convert the character into a phoneme sequence using a grapheme-to-phoneme (G2P) algorithm. The learning speech data of the first language may be data obtained by recording a speech in which a person reads the learning text of the first language, a sound feature or spectrogram extracted from the recorded data, or the like. The first learning data may not include a language identifier or language information for the first language.

The machine learning unit 420 may receive a plurality of learning data pairs 412 of a second language. Each of the learning data pairs 412 of the second language may include a learning text of the second language and learning speech data of the second language corresponding to the learning text of the second language. The first language may be different from the second language.

The learning text of the second language may include at least one character, and the machine learning unit 420 may convert the character into a phoneme sequence using a G2P algorithm. The learning speech data of the second language may be data obtained by recording a speech in which a person reads the learning text of the second language, a sound feature or spectrogram extracted from the recorded data, or the like. The second learning data may not include a language identifier or language information for the second language.

The machine learning unit 420 may perform machine learning based on the received learning data pairs 411 of the first language and learning data pairs 412 of the second language to generate a single artificial neural network text-to-speech synthesis model 430. In an embodiment, the machine learning unit 420 may learn similarity information between the phoneme of the first language and the phoneme of the second language without prior information on the first language and the second language to generate the single artificial neural network text-to-speech synthesis model 430. For example, the machine learning unit 420 may generate the single artificial neural network text-to-speech synthesis model by learning similarity information between the phoneme of the first language and the phoneme of the second language based on the plurality of learning data pairs 411 of the first language and the plurality of learning data pairs 412 of the second language instead of receiving a language identifier of the first language, a language identifier of the second language, pronunciation similarity information between the phoneme of the first language and the phoneme of the second language, and notation similarity information between the phoneme of the first language and the phoneme of the second language.

Here, a language identifier may be an identifier indicative of one of various languages used in various countries or by various people such as Korean, Japanese, Chinese, and English. Also, the pronunciation similarity information may be information that matches phonemes having similar pronunciations between languages, and the notation similarity information may be information that matches phonemes having similar notations between languages. The similarity information will be described in detail with reference to FIGS. 11 and 12.

Since languages have different pronunciations and notations, a machine learning model is generated for each language by preparing learning data for each language. Alternatively, a single machine learning model is generated by preparing similarity information between the learned languages and inputting the similarity information together with the learning data. According to an embodiment of the present disclosure, a multilingual text-to-speech synthesis model may be implemented as a single machine learning model without the similarity information between the learned languages. FIG. 4 shows that learning data for two languages is received to generate a single artificial neural network text-to-speech synthesis model. However, the present invention is not limited thereto, and learning data for three or more languages may be received to generate a single artificial neural network text-to-speech synthesis model.

In an embodiment, a speech may be synthesized from a text using the single artificial neural network text-to-speech synthesis model 430 generated by the machine learning unit 420, and then the synthesized speech may be output. A method of synthesizing a speech from a text using the single artificial neural network text-to-speech synthesis model 430 and outputting the synthesized speech will be described in detail with reference to FIGS. 5 to 7.

Figure 5:
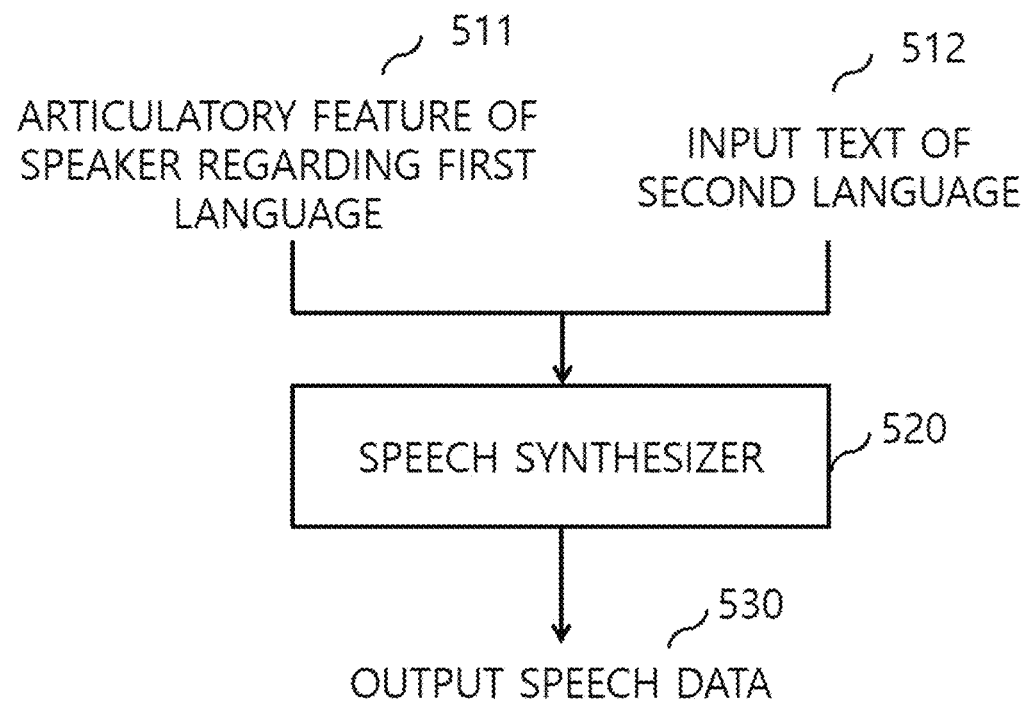
FIG. 5 is a diagram showing that a speech synthesizer synthesizes output speech data based on an articulatory feature of a speaker regarding the first language and an input text of the second language according to an embodiment of the present disclosure.

FIG. 5 is a diagram showing that a speech synthesizer 520 synthesizes output speech data 530 based on an articulatory feature 511 of a speaker regarding the first language and an input text 512 of the second language according to an embodiment of the present disclosure. The speech synthesizer 520 may correspond to a data recognition unit 1520 of FIG. 15. The speech synthesizer 520 may be used to receive the single artificial neural network text-to-speech synthesis model generated by the machine learning unit 420 of FIG. 4 and synthesize output speech data. As shown, the speech synthesizer 520 may receive the articulatory feature 511 of the speaker regarding the first language and the input text 512 of the second language.

The articulatory feature 511 of the speaker regarding the first language may be generated by extracting a feature vector from speech data that the speaker utters in the first language. For example, the articulatory feature of the speaker may include the speaker's voice tone or voice pitch. The input text 512 of the second language may contain at least one character written in the second language.

The speech synthesizer 520 may input the articulatory feature 511 of the speaker regarding the first language and the input text 512 of the second language to the single artificial neural network text-to-speech synthesis model to generate the output speech data 530. The output speech data 530 may be speech data obtained by synthesizing a speech from the input text 512 of the second language, and the articulatory feature 511 of the speaker regarding the first language may be reflected therein. That is, the output speech data 530 may be data obtained by synthesizing a speech in which the corresponding speaker speaks the input text 512 of the second language by simulating the corresponding speaker's speech based on the articulatory feature 511 of the speaker regarding the first language. In an embodiment, the output speech data 530 may be output to a loudspeaker or the like.

Figure 6:
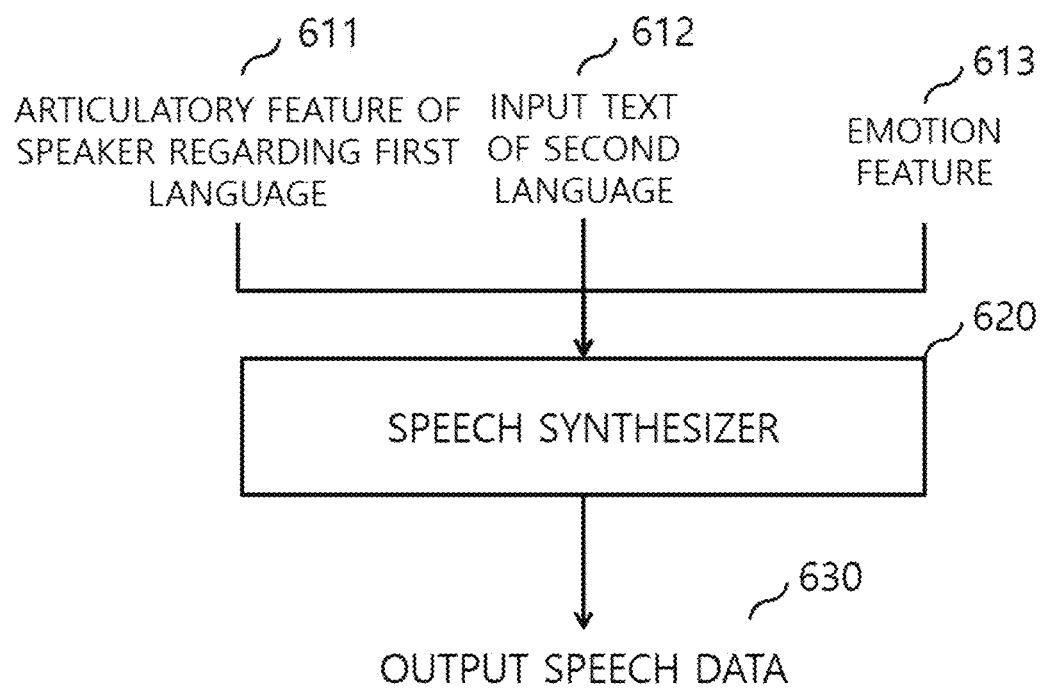
FIG. 6 is a diagram showing that a speech synthesizer generates output speech data based on an articulatory feature of a speaker regarding the first language, an input text of the second language, and an emotion feature according to an embodiment of the present disclosure.

FIG. 6 is a diagram showing that a speech synthesizer 620 generates output speech data 630 based on an articulatory feature 611 of a speaker regarding the first language, an input text 612 of the second language, and an emotion feature 613 according to an embodiment of the present disclosure. The speech synthesizer 620 may correspond to the data recognition unit 1520 of FIG. 15. The speech synthesizer 620 may be used to receive the single artificial neural network text-to-speech synthesis model generated by the machine learning unit 420 of FIG. 4 and synthesize the output speech data 630. As shown, the speech synthesizer 620 may receive the articulatory feature 611 of the speaker regarding the first language, the input text 612 of the second language, and the emotion feature 613. The articulatory feature of the speaker regarding the first language and the input text of the second language have been described above with reference to FIG. 5, and thus a redundant description thereof will be omitted.

In an embodiment, the emotion feature 613 may represent at least one of joy, sadness, anger, fear, trust, disgust, surprise, and expectation. In another embodiment, the emotion feature 613 may be generated by extracting a feature vector from speech data. The speech synthesizer 620 may input the articulatory feature 611 of the speaker regarding the first language, the input text 612 of the second language, and the emotion feature 613 to the single artificial neural network text-to-speech synthesis model to generate the output speech data 630.

The output speech data 630 may be speech data obtained by synthesizing a speech from the input text 612 of the second language, and the articulatory feature 611 of the speaker regarding the first language and the emotion feature 613 may be reflected therein. That is, the output speech data 630 may be data obtained by synthesizing a speech in which the corresponding speaker speaks the input text 612 of the second language with the input emotion feature 613 by simulating the corresponding speaker's speech based on the articulatory feature 611 of the speaker regarding the first language and reflecting the emotion feature 613 therein. For example, when the emotion feature 613 represents anger, the speech synthesizer 620 may generate the output speech data 630 indicating that the corresponding speaker speaks the input text 612 of the second language with anger. In an embodiment, the output speech data 630 may be output to a loudspeaker or the like.

Figure 7:
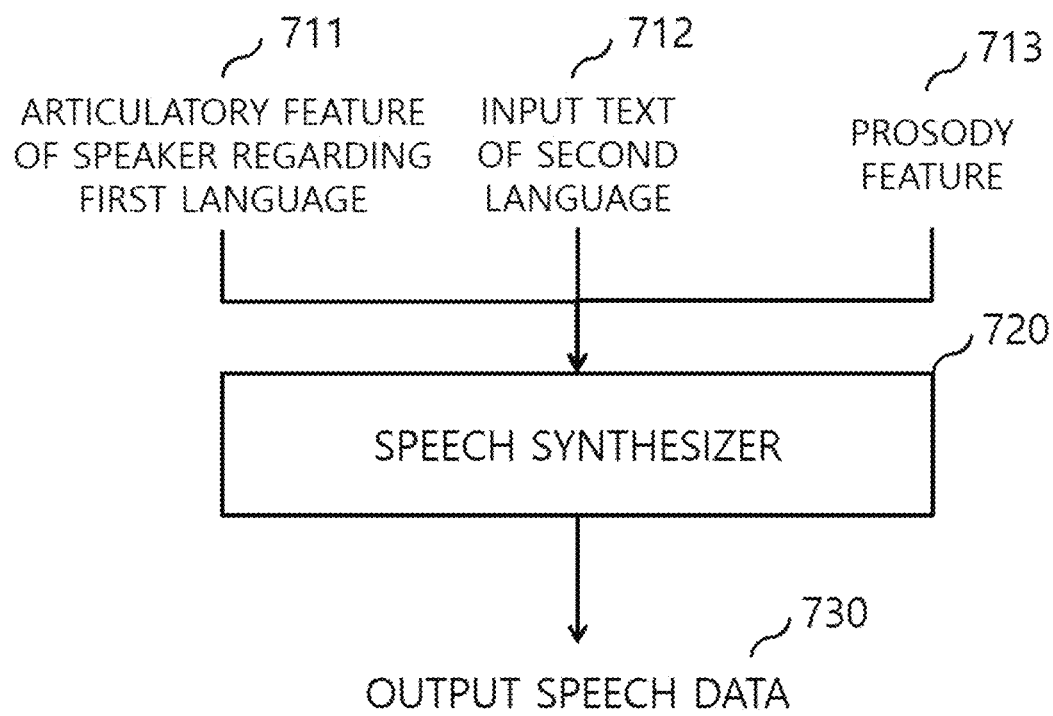
FIG. 7 is a diagram showing that a speech synthesizer generates output speech data based on an articulatory feature of a speaker regarding the first language, an input text of the second language, and a prosody feature according to an embodiment of the present disclosure.

FIG. 7 is a diagram showing that a speech synthesizer 720 generates output speech data 730 based on an articulatory feature 711 of a speaker regarding the first language, an input text 712 of the second language, and a prosody feature 713 according to an embodiment of the present disclosure. The speech synthesizer 720 may correspond to the data recognition unit 1520 of FIG. 15. The speech synthesizer 720 may be used to receive the single artificial neural network text-to-speech synthesis model generated by the machine learning unit 420 of FIG. 4 and synthesize the output speech data 730. As shown, the speech synthesizer 720 may receive the articulatory feature 711 of the speaker regarding the first language, the input text 712 of the second language, and the prosody feature 713. The articulatory feature of the speaker regarding the first language and the input text of the second language have been described above with reference to FIG. 5, and thus a redundant description thereof will be omitted.

The prosody feature 713 may include at least one of information on utterance speed, information on accentuation, information on voice pitch, and information on pause duration (e.g., information on pauses while reading). In an embodiment, the prosody feature 713 may be generated by extracting a feature vector from speech data. The speech synthesizer 720 may input the articulatory feature 711 of the speaker regarding the first language, the input text 712 of the second language, and the prosody feature 713 to the single artificial neural network text-to-speech synthesis model to generate the output speech data 730.

The output speech data 730 may be speech data obtained by synthesizing a speech from the input text 712 of the second language, and the articulatory feature 711 and the prosody feature 713 may be reflected therein. That is, the output speech data 730 may be data obtained by synthesizing a speech in which the corresponding speaker speaks the input text 712 of the second language with the input prosody feature 713 by simulating the corresponding speaker's speech based on the articulatory feature 711 of the speaker regarding the first language and reflecting the prosody feature 713 therein. For example, the speech synthesizer 720 may generate the output speech data 730 in which the corresponding speaker speaks the input text 712 of the second language according to information regarding utterance speed, accentuation, voice pitch, and pause duration (pauses while reading) included in the prosody feature 713.

In FIGS. 6 and 7, it is shown that the emotion feature 613 or the prosody feature 713 are input to a speech synthesizer together with the articulatory feature of the speaker regarding the first language and the input text of the second language. However, the present invention is not limited thereto, and the speech synthesizer may be configured as inputting any one or more of the articulatory feature, emotion feature, and prosody feature of the speaker regarding the first language in addition to the input text of the second language.

Figure 8:
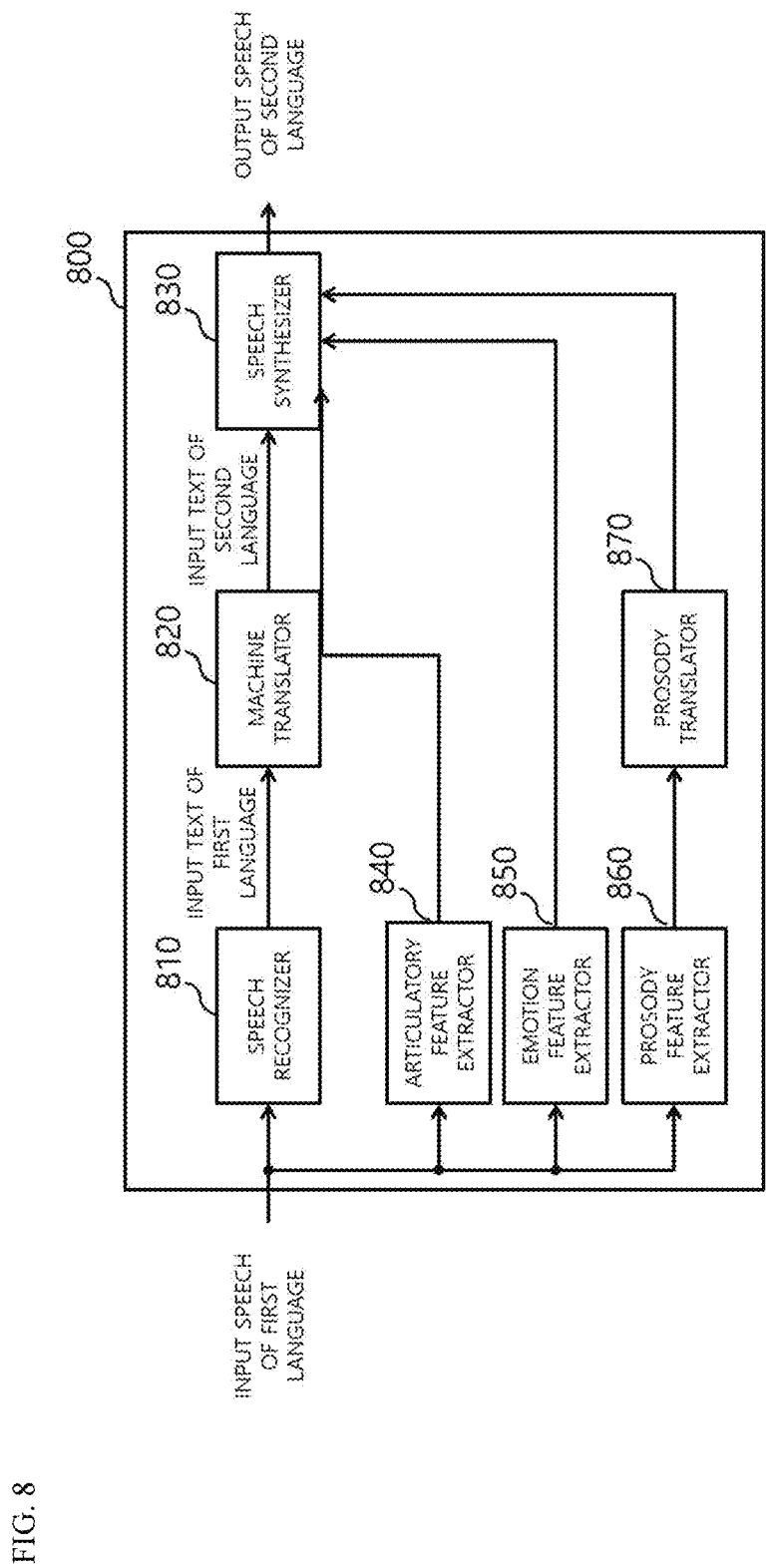
FIG. 8 is a diagram showing a configuration of a speech translation system according to an embodiment of the present disclosure.

FIG. 8 is a diagram showing a configuration of a speech translation system 800 according to an embodiment of the present disclosure. The speech translation system 800 may include a speech recognizer 810, a machine translator 820, a speech synthesizer 830, an articulatory feature extractor 840, an emotion feature extractor 850, a prosody feature extractor 860, and a prosody translator 870. The speech synthesizer 830 may correspond to the data recognition unit 1520 of FIG. 15. As shown, the speech translation system 800 may receive an input speech of a first language.

The received input speech of the first language may be delivered to the speech recognizer 810, the articulatory feature extractor 840, the emotion feature extractor 850, and the prosody feature extractor 860. The speech recognizer 810 may receive the input speech of the first language and convert the input speech of the first language into an input text of the first language. The machine translator 820 included in the speech translation system 800 may convert or translate the input text of the first language into an input text of a second language and deliver the input text of the second language to the speech synthesizer 830.

The articulatory feature extractor 840 may extract a feature vector from the input speech of the first language and generate the articulatory feature of a speaker who utters the input speech of the first language. The speech synthesizer 830 may input the input text of the second language and the articulatory feature of the speaker regarding the first language to the single artificial neural network text-to-speech synthesis model and may generate output speech data of the second language corresponding to the input text of the second language that simulates the speaker's speech. In this case, the output speech of the second language may be a speech synthesized by reflecting the articulatory feature of the speaker who utters the input speech of the first language.

The emotion feature extractor 850 may extract an emotion feature from the input speech of the first language and deliver the extracted emotion feature to the speech synthesizer 830. The speech synthesizer 830 may input the input text of the second language, the articulatory feature of the speaker regarding the first language, and the emotion feature to the single artificial neural network text-to-speech synthesis model and may generate output speech data of the second language corresponding to the input text of the second language that simulates the speaker's speech and reflects the emotion feature of the input speech of the first language. In this case, the output speech of the second language may be a speech synthesized by reflecting the articulatory feature and emotion feature of the speaker who utters the input speech of the first language.

The prosody feature extractor 860 may extract a prosody feature from the input speech of the first language. The prosody feature extractor 860 may deliver the extracted prosody feature to the prosody translator 870 and translate a prosody feature regarding the first language into a prosody feature regarding the second language. That is, the prosody translator 870 may generate information for reflecting the prosody feature extracted from the input speech of the first language in the output speech of the second language.

The speech synthesizer 830 may input the input text of the second language, the articulatory feature of the speaker regarding the first language, and the translated prosody feature to the single artificial neural network text-to-speech synthesis model and may generate output speech data of the second language corresponding to the input text of the second language that simulates the speaker's speech and reflects the prosody feature of the input speech of the first language. In this case, the output speech of the second language may be a speech synthesized by reflecting the articulatory feature and prosody feature of the speaker who utters the input speech of the first language. When the prosody feature is reflected, features such as speech speed, pauses while reading, emphasis, etc. of the input speech of the first language may be applied to the output speech of the second language.

For example, when a user places an emphasis on a word among the input speech of the first language, the prosody translator 870 may generate information for emphasizing a word of the second language corresponding to the emphasized word of the first language. The speech synthesizer 830 may generate a speech with emphasis on the word of the second language corresponding to the emphasized word of the first language based on the information received from the prosody translator 870.

In an embodiment, the speech synthesizer 830 may input the input text of the second language, the articulatory feature of the speaker regarding the first language, the emotion feature, and the translated prosody feature to the single artificial neural network text-to-speech synthesis model and may generate output speech data of the second language corresponding to the input text of the second language that simulates the speaker's speech and reflects the emotion feature and the prosody feature of the input speech of the first language. In this case, the output speech of the second language may be a speech synthesized by reflecting the prosody feature, the emotion feature, and the articulatory feature of the speaker who utters the input speech of the first language.

When the speaker's feature is extracted from the input speech of the first language and used to synthesize a translated speech, the voice of the corresponding speaker may be simulated to generate the output speech of the second language with a similar voice even when the voice of the corresponding speaker is not pre-learned. Also, when the emotion feature of the speaker is extracted from the input speech of the first language, the emotion about the utterance of the corresponding speaker may be simulated to generate a more natural output speech of the second language. Also, when the prosody feature of the speaker is extracted from the input speech of the first language, the prosody of the utterance of the corresponding speaker may be simulated to generate a more natural output speech of the second language.

In FIG. 8, it is shown that all of the articulatory feature, the emotion feature, and the prosody feature are extracted from the input speech of the first language to synthesize a speech. However, the present invention is not limited thereto. In another embodiment, at least one of the articulatory feature, the emotion feature, and the prosody feature may be extracted from an input speech of another speaker. For example, the emotion feature and the prosody feature may be extracted from the input speech of the first language, and the articulatory feature may be extracted from another input speech (e.g., a celebrity's speech) to synthesize a speech. In this case, the emotion and prosody of the speaker who utters the input speech of the first language are reflected in the synthesized speech, but the voice of a speaker (e.g., a celebrity) who utters another input speech may be reflected.

Figure 9:
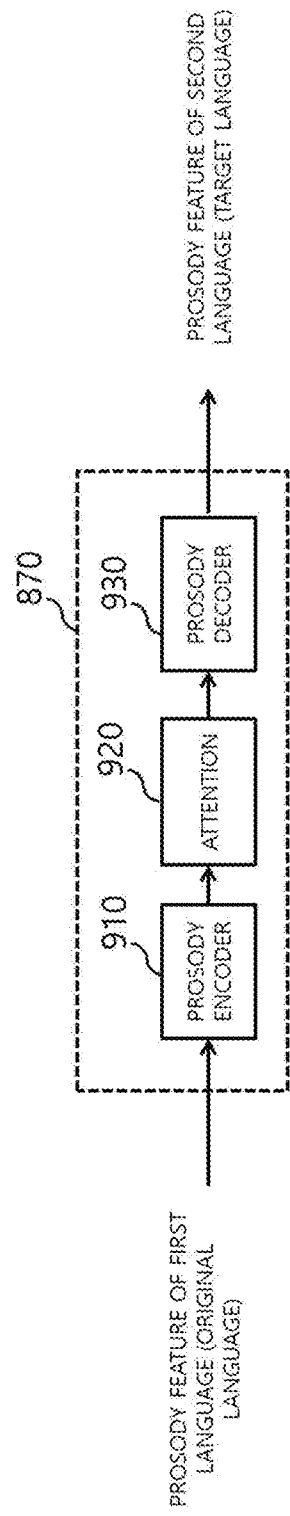
FIG. 9 is a diagram showing a configuration of a prosody translator according to an embodiment of the present disclosure.

FIG. 9 is a diagram showing a configuration of a prosody translator 870 according to an embodiment of the present disclosure. As shown, the prosody translator 870 may include a prosody encoder 910, an attention 920, and a prosody decoder 930. The prosody encoder 910 may receive the prosody feature of the first language extracted from the input speech of a first language (an original language) by the prosody feature extractor.

The received first prosody feature is converted into a prosody feature of a second language (a target language) via the prosody encoder 910, the attention 920, and the prosody decoder 930. In an example, the prosody translator 870 may convert a prosody feature of an original language into a prosody feature of a target language by learning using a sequence-to-sequence model (seq2seq). That is, the sequence-to-sequence model may be implemented by combining an attention mechanism (see "Neural Machine Translation by Jointly Learning to Align and Translate," Dzmitry Bandanau, at al., 2015 and "Effective Approaches to Attention-based Neural Machine Translation," Minh-Thang Luong, at al., 2015) with an encoder-decoder architecture based on a recurrent neural network (RNN) (see "Sequence to Sequence Learning with Neural Networks," Ilya Sutskever, et al., 2014).

Figure 10:
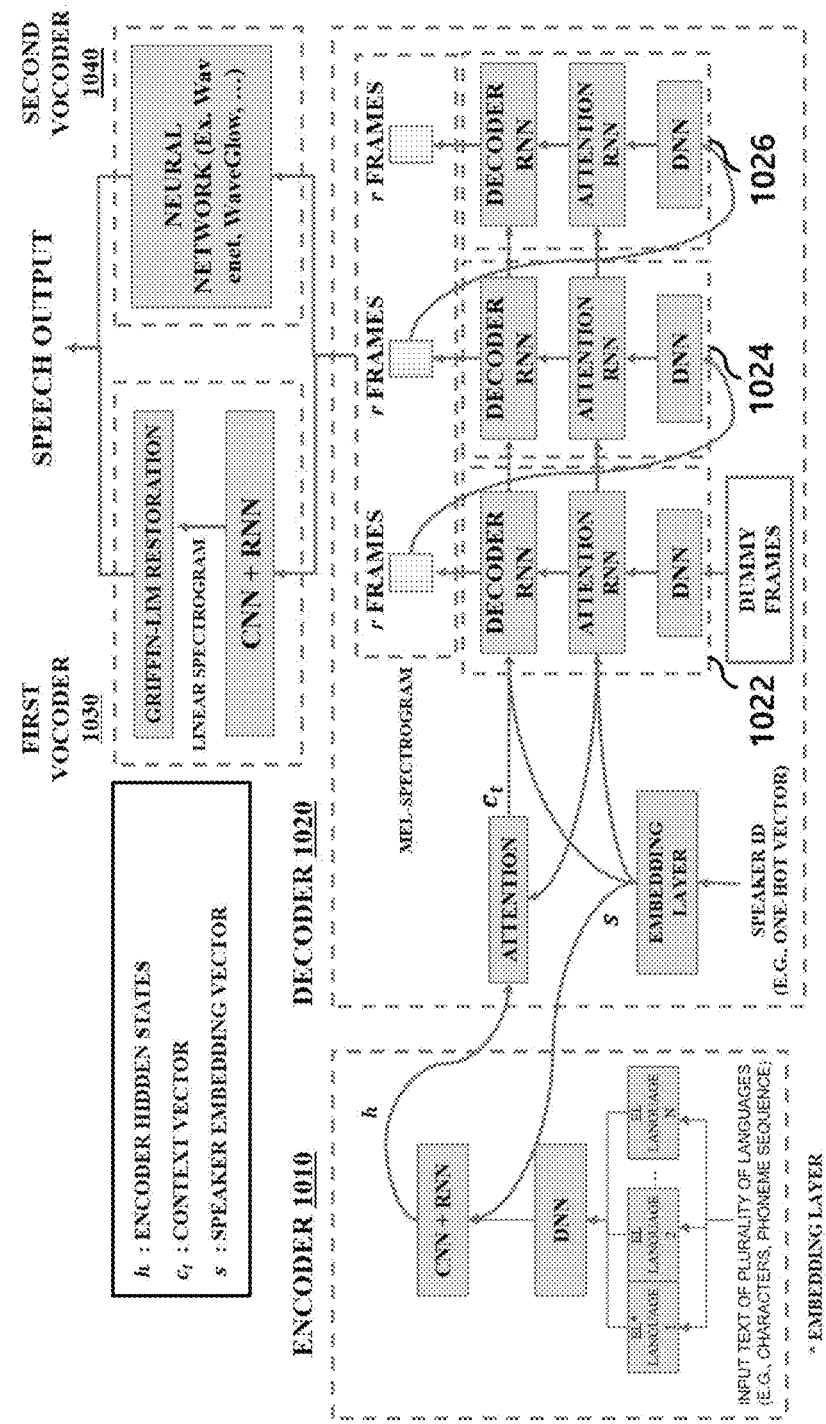
FIG. 10 is a diagram showing a configuration of a multilingual text-to-speech synthesizer according to an embodiment of the present disclosure.

FIG. 10 is a diagram showing a configuration of a multilingual text-to-speech synthesizer 1000 according to an embodiment of the present disclosure. As shown, the multilingual text-to-speech synthesizer 1000 may include an encoder 1010, a decoder 1020, and a vocoder 1030. The encoder 1010 may receive an input text.

The input text may be composed of a plurality of languages and may not contain a language identifier or language information. For example, the input text may contain a sentence such as "안녕하세요" or "How are you?" The encoder 1010 may divide the received input text in units of a syllable, a character, or a phoneme. Alternatively, the encoder 1010 may receive the input text divided in units of a syllable, a character, or a phoneme.

The encoder 1010 may include at least one embedding layer (e.g., EL language 1, EL language 2, . . . , EL language N). At least one embedding layer of the encoder 1010 may convert the input text divided in units of a syllable, a character, or a phoneme into a text embedding vector. The encoder 1010 may use a pre-trained machine learning model in order to convert the divided input text into the text embedding vector. The encoder 1010 may update the machine learning model by performing machine learning. When the machine learning model is updated, the text embedding vector for the divided input text may also be changed.

The encoder 1010 may input the text embedding vector to a deep neural network (DNN) module including a fully-connected layer. The DNN may be a general feedforward layer or linear layer.

The encoder 1010 may input an output of the DNN to a module including at least one of a convolutional neural network (CNN) and a recurrent neural network (RNN). In this case, the module including at least one of the CNN and the RNN may receive an output s of the embedding layer of the decoder 1020 along with the output of the DNN. The CNN may capture a regional feature according to a size of a convolution kernel, and the RNN may capture long term dependency. The module including at least one of the CNN and the RNN may output hidden states h of the encoder 1010.

The embedding layer of the decoder 1020 may perform operations similar to those of the embedding layer of the encoder 1010. The embedding layer may receive a speaker ID. For example, the speaker ID may be a one-hot vector. In an embodiment, the speaker ID of "Trump" may be designated as "1," the speaker ID of "Moon Jaein" may be designated as "2," and the speaker ID of "Obama" may be designated as "3." The embedding layer of the decoder 1020 may convert a speaker ID into a speaker embedding vector s. The decoder 1020 may use a pre-trained machine learning model in order to convert the speaker ID into the speaker embedding vector s. The decoder 1020 may update the machine learning model by performing machine learning. When the machine learning model is updated, the speaker embedding vector s for the speaker ID may also be changed.

The attention of the decoder 1020 may receive encoder hidden states h from the encoder 1010. Also, the attention of the decoder 1020 may receive information from an attention RNN. The information received from the attention RNN may be information regarding which speeches the decoder 1020 has generated up to the previous time-step. Also, the attention of the decoder 1020 may output a context vector Ct based on the encoder hidden states h and the information received from the attention RNN. The encoder hidden states h may be information regarding an input text of which speech should be generated.

The context vector Ct may be information for determining from which part of the input text a speech should be generated at the current time-step. For example, the attention of the decoder 1020 may output information for generating a speech based on the front portion of the text input at the beginning of the speech generation and generating a speech based on the rear portion of the text input as the speech is being generated.

As shown, the decoder 1020 may configure the structure of the artificial neural network such that decoding is performed differently depending on the speaker by inputting the speaker embedding vector s to the attention RNN, the decoder RNN, and the module including at least one of the CNN and the RNN of the encoder 1010. The RNN of the decoder 1020 may be configured in an autoregressive manner. That is, r frames output at the previous time-step may be used as an input at the current time-step. Since an initial time-step 1022 does not have the previous time-step, dummy frames may be input to the DNN.

The decoder 1020 may include a DNN including a fully-connected layer. The DNN may be a general feedforward layer or linear layer. Also, the decoder 1020 may include an attention RNN including a gated recurrent unit (GRU). The attention RNN is a layer that outputs information to be used in the attention. The attention has been described above, and thus a detailed description thereof will be omitted.

The decoder 1020 may include a decoder RNN including a residual GRU. The decoder RNN may receive position information of the input text from the attention. That is, the position information may be information regarding which position in the input text the decoder 1020 is converting into a speech.

The decoder RNN may receive information from the attention RNN. The information received from the attention RNN may be information regarding which speeches the decoder has generated up to the previous time-step and information regarding a speech to be generated at the current time-step. The decoder RNN may generate the next output speech following the output speeches that have been generated so far. The output speech may have a mel-spectrogram form and may include r frames.

For the purpose of text-to-speech synthesis, the operations of the DNN, the attention RNN, and the decoder RNN may be repeatedly performed. For example, r frames acquired at the initial time-step 1022 may be inputs for a subsequent time-step 1024. Also, the r frames output at the time-step 1024 may be inputs for a subsequent time-step 1026.

Through the above-described process, a speech may be generated for each unit of the text. The text-to-speech synthesis system may acquire a mel-spectrogram for the whole text by concatenating mel-spectrograms for the respective time-steps in chronological order. The mel-spectrogram for the whole text generated in the decoder 1020 may be output to a first vocoder 1030 or a second vocoder 1040.

The first vocoder 1030 may include a Griffin-Lim restoration module and a module including at least one of the CNN and the RNN. The module including at least one of the CNN and the RNN of the first vocoder 1030 may perform an operation similar to that of the module including at least one of the CNN and the RNN of the encoder 1010. That is, the module including at least one of the CNN and the RNN of the first vocoder 1030 may capture a regional feature and long term dependency and may output a linear-scale spectrogram. The first vocoder 1030 may simulate and output a speech signal corresponding to the input text with a voice corresponding to a speaker ID by applying the Griffin-Lim algorithm to the linear-scale spectrogram.

The second vocoder 1040 may acquire the speech signal from the mel-spectrogram based on a machine learning model. The machine learning model may learn a network for predicting the speech signal from the mel-spectrogram. For example, a model such as WaveNet or WaveGlow may be used as the machine learning model. The second vocoder 1040 may be used in place of the first vocoder 1030.

The multilingual text-to-speech synthesizer 1000 based on an artificial neural network is trained using a large database existing as a pair of a multilingual learning text and a corresponding learning speech signal. The multilingual text-to-speech synthesizer 1000 may receive a learning text, compare an output speech signal to a learning speech signal, and define a loss function. The speech synthesizer may learn the loss function through an error back-propagation algorithm and thus may obtain an artificial neural network that outputs a finally desired speech when any text is input.

The multilingual text-to-speech synthesizer 1000 may synthesize a speech that simulates a specific speaker's voice using the single artificial neural network text-to-speech synthesis model generated by the above method. Also, the multilingual text-to-speech synthesizer 1000 may synthesize a speech of a language different from the mother language of the specific speaker by simulating the corresponding speaker's voice. That is, the multilingual text-to-speech synthesizer 1000 may synthesize a speech in which a speaker who utters a first language speaks a second language. For example, the multilingual text-to-speech synthesizer 1000 may synthesize a speech as if Trump speaks a Korean input text in Korean.

FIG. 11 shows a correspondence between phonemes of International Phonetic Alphabet (IPA) and Korean grapheme-to-phoneme (KoG2P) and a correspondence between phonemes having common pronunciations of English and Korean. The pronunciations of different languages may be described by one alphabetical system IPA. The IPA for the pronunciations of different languages may be used as similarity information. The transformation table of IPA-CMU-dict and IPA-KoG2P is shown in Table 1110. In terms of the IPA, no one-to-one correspondence is present between the phonemes of the first language and the phonemes of the second language, but a subset including phonemes having common pronunciations of the first language and the second language may be selected. For example, a subset of phonemes having common pronunciations of English and Korean is shown in Table 1120.

The first language and the second language may have different character systems and also may have different pronunciation systems. When the first language and the second language are expressed using the IPA, which is the same alphabetical system, a speech synthesis model may be acquired through standardized processing for each language. However, the IPA represents each language in the same alphabetical system, but does not fully represent the similarity in pronunciations or notations between different languages. For example, the IPA alphabets used in the first language may not be used at all in the second language. Since the speech synthesis model does not know which IPA alphabets of the second language corresponds to IPA alphabets used only in the first language, only a speech synthesis model specialized for each language may be obtained when the IPA is used. That is, the speech synthesis model for the first language can only process data related to the first language and cannot process data related to the second language. On the contrary, the speech synthesis model for the second language can only process data related to the second language and cannot process data related to the first language.

FIG. 12 shows a table indicative of English phonemes that are the most similar to Korean phonemes. The text-to-speech synthesis system according to an embodiment of the present disclosure may calculate a phoneme cosine distance between anchor phonemes of languages based on a machine learning model. A phoneme embedding vector acquired based on the machine learning model may be used to calculate the cosine distance. The phoneme cosine distance may indicate the similarity between phonemes.

Five closest English phoneme embeddings for Korean phonemes are listed based on the calculated phoneme cosine distance as shown in Table 1210. The numbers 0, 1, and 2 behind the English phoneme embedding indicate "no stress," "primary stress," and "secondary stress," respectively. CMUdict distinguishes accentuated pronunciations while IPA may not distinguish accentuated pronunciations. Symbols in parentheses are IPA symbols.

According to Table 1210, it can be seen that five closest phoneme embeddings for anchor phonemes based on the machine learning model according to an embodiment of the present disclosure are similar to those of Table 1120 of FIG. 11. That is, it can be seen that the machine learning model according to an embodiment of the present disclosure automatically learns similar pronunciations or notations of languages although similarity information regarding pronunciations or notations between the phoneme of the first language and the phoneme of the second language, language identifier/language information for the first language, and language identifier/language information for the second language are not received upon the learning. Accordingly, the text-to-speech synthesis system according to an embodiment of the present invention may perform text-to-speech synthesis (TTS) on a plurality of languages learned based on the single artificial neural network text-to-speech synthesis model.

Figure 13:
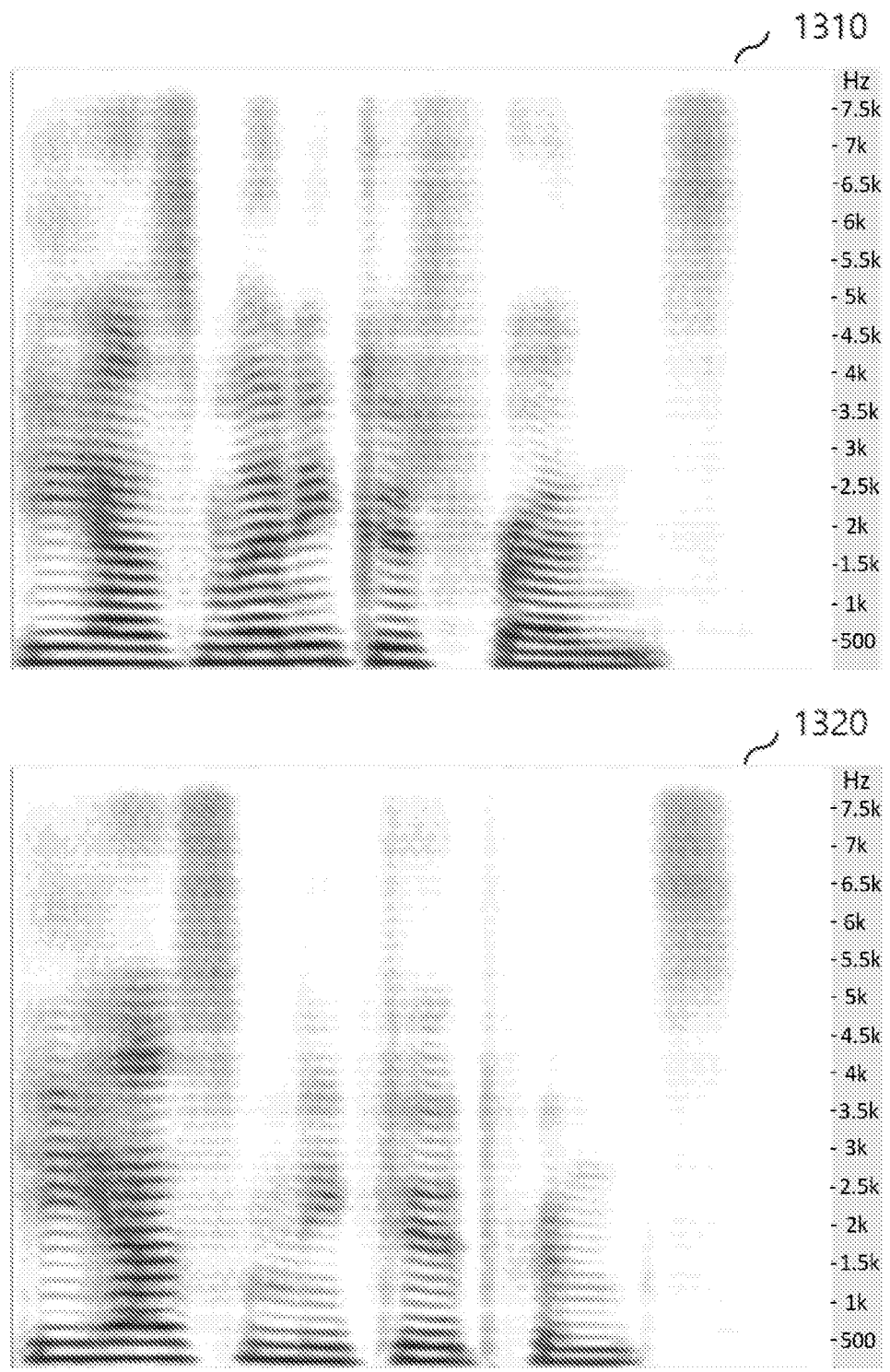
FIG. 13 is a spectrogram showing similarity between a speech generated using English phonemes and a speech generated using Korean phonemes.

FIG. 13 is a spectrogram showing similarity between a speech generated using English phonemes and a speech generated using Korean phonemes. A spectrogram 1310 is a result of synthesizing a speech of a sentence "He has many good friends" using an English phoneme sequence consisting of HH, IY1, HH, AE1, Z, M, EH1, N, IY0, G, UH1, D, F, R, EH1, N, D, and Z. A spectrogram 1320 is a result of synthesizing a speech using a Korean phoneme sequence consisting of h0, wi, h0, ya, s0, mf, ye, nf, ii, kk, yo, tt, ph, ks, ye, nf, tt, and s0 which is generated by replacing the phonemes in the English phoneme sequence of the above sentence with the closest Korean phonemes.

Comparing the spectrogram 1310 to the spectrogram 1320, it can be seen that the result of synthesizing the speech with the English phoneme sequence and the result of synthesizing the speech with the Korean phoneme sequence are similar to each other. Accordingly, it can be seen that a high-quality speech synthesis result can be obtained even when a speech is synthesized from a text of the second language using phonemes of the first language. That is, although a speech is synthesized from a text of the second language using the articulatory feature of the speaker who utters the first language, a result in which the speaker having the first language as the mother language utters the second language may be obtained.

FIG. 14 is a table 1410 illustrating a character error rate (CER) of English data used to train a TTS machine learning model over time. In this example, the TTS machine learning model was trained while varying the amount of English learning data, provided that Korean learning data was sufficient. The table 1410 shows an error rate obtained by a person who listens to a speech output synthesized from a text, records the speech output by characters, and compares the result to an original text in order to quantify speech synthesis quality.

According to the table 1410, when an English speech corresponding to an English text of a Korean speaker is synthesized by inputting the articulatory feature of the corresponding speaker and the English text to the TTS machine learning model, the CER decreases as the time of English learning data used increases. That is, the CER of the speech of the English text read by the Korean speaker decreases as the time of the English learning data used for machine learning increases.

On the other hand, when a Korean speech corresponding to a Korean text of an English speaker is synthesized by inputting the articulatory feature of the corresponding speaker and the Korean text to the TTS machine learning model, the CER does not significantly change although the time of English learning data used increases. This may indicate that the CER has already been reduced to a threshold because the amount of data in Korean used for the machine learning is greater than the amount of data in English. It can be seen that the CER may be sufficiently reduced when the text-to-speech synthesis system performs machine learning using an amount of data greater than or equal to a threshold amount. Also, even when the TTS machine learning model is trained using a large amount of Korean learning data and a small amount of English learning data, it can be seen that a result of synthesizing a speech from an English text is produced at a relatively high quality.

According to the present disclosure, it is possible to generate a multilingual TTS machine learning model using only an input text (a text input) and output speech (an audio output) for a plurality of languages in an end-to-end manner. Also, conventional methods require a notation scheme common to many languages such as the IRA or requires prior information of similarity between languages in order to represent different languages using one linguistic feature set. However, according to the present disclosure, there is no need for linguistic features, and thus languages may use different alphabets and does not require prior information regarding similarity between languages.

Also, according to the present disclosure, since a model is trained in an end-to-end manner, it is possible to process a text-to-speech synthesis (TTS) task by utilizing a single neural network model without having to predict features required in the existing TTS such as phoneme duration by utilizing a separate model. Also, according to the present disclosure, it is possible to adjust foreigner accents/fluent accents depending on whether a speaker ID is used while a text encoding is extracted by a text encoder. For example, when a speech of a first language is generated and a pronunciation of a second language is strong, a penalty may be assigned upon learning. According to a machine learning model to which a penalty is applied, a speech closer to the pronunciation of the first language may be generated.

Figure 15:
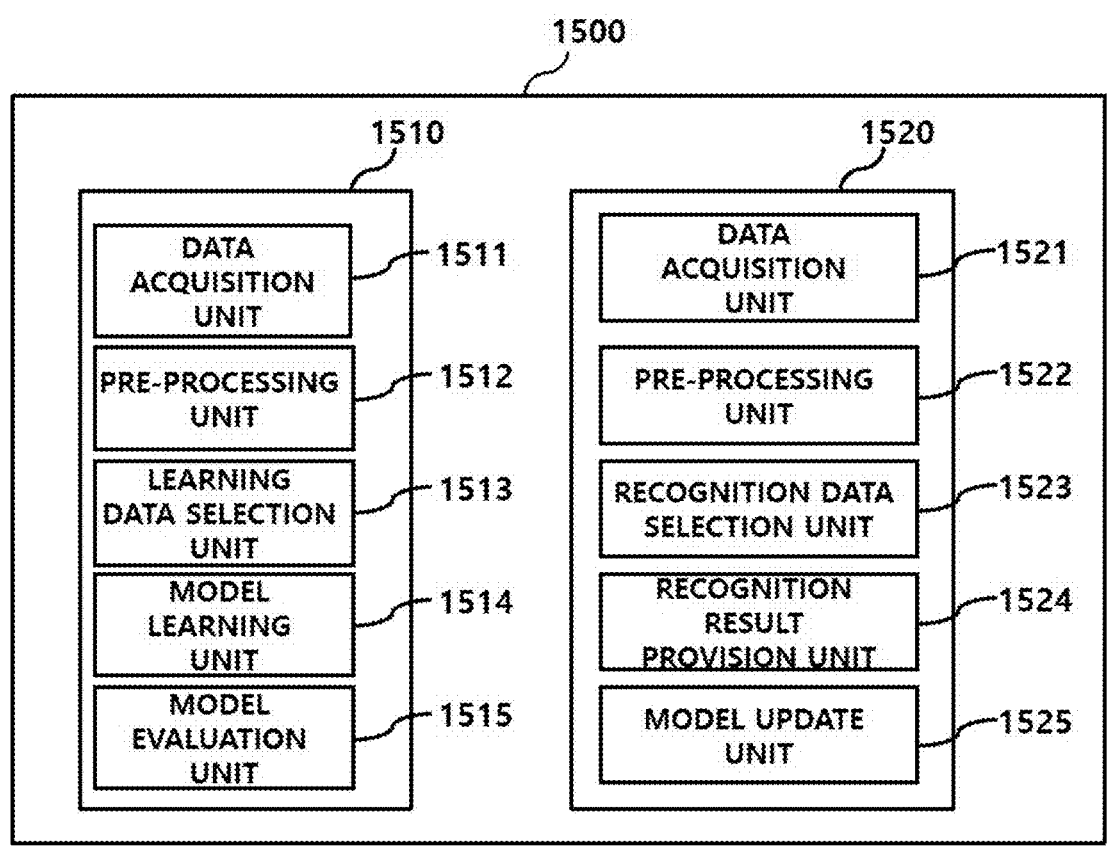
FIG. 15 is a block diagram of a text-to-speech synthesis system according to an embodiment of the present disclosure.

FIG. 15 is a block diagram of a text-to-speech synthesis system 1500 according to an embodiment of the present disclosure. According to one embodiment, the text-to-speech synthesis system 1500 according to an embodiment may include a data learning unit 1510 and a data recognition unit 1520. The data learning unit 1510 may input data and acquire a machine learning model. Also, the data recognition unit 1520 may generate an output speech by applying the data to the machine learning model. The text-to-speech synthesis system 1500 may include a processor and a memory.

The data learning unit 1510 may learn a speech for a text. The data learning unit 1510 may learn a criterion on which speech is to be output according to the text. Also, the data learning unit 1510 may learn a criterion on which speech feature is to be used to output the speech. The speech feature may include at least one of a phoneme pronunciation and a user's tone, intonation, or accent. The data learning unit 1510 may learn a speech for a text by acquiring data to be used for the learning and by applying the acquired data to a data learning model to be described below.

The data recognition unit 1520 may output a speech for a text based on the text. The data recognition unit 1520 may output a speech from a predetermined text using the learned data learning model. The data recognition unit 1520 may acquire a predetermined text (data) according to a predetermined criterion by the learning. Also, the data recognition unit 1520 may output a speech based on the predetermined data by setting the acquired data as an input value and using the data learning model. Also, a result value that is output by the data learning model using the acquired data as an input value may be used to update the data learning model.

At least one of the data learning unit 1510 or the data recognition unit 1520 may be manufactured in the form of at least one hardware chip and mounted on an electronic apparatus. For example, at least one of the data learning unit 1510 or the data recognition unit 1520 may be manufactured in the form of an artificial intelligence (AI)-dedicated hardware chip or a portion of a conventional general-purpose processor (e.g., a CPU or an application processor) or a graphics processor (e.g., a GPU) and thus may be mounted on various electronic apparatuses that have been described above.

Also, the data learning unit 1510 and the data recognition unit 1520 may be mounted on separate electronic apparatuses. For example, one of the data learning unit 1510 and the data recognition unit 1520 may be included in an electronic apparatus, and the other may be included in a server. Also, the following operations may be performed between the data learning unit 1510 and the data recognition unit 1520 in a wired or wireless manner. Model information established by the data learning unit 1510 may be provided to the data recognition unit 1520, and data input to the data recognition unit 1520 may be provided to the data learning unit 1510 as additional learning data.

Meanwhile, at least one of the data learning unit 1510 or the data recognition unit 1520 may be implemented as a software module. When at least one of the data learning unit 1510 or the data recognition unit 1520 is implemented as a software module (or a program module including instructions), the software module may be stored in a memory or a non-transitory computer-readable medium. Also, in this case, at least one software module may be provided by an operating system (OS) or may be provided by a predetermined application. Unlike this, some of the at least one software module may be provided by an OS, and the others may be provided by a predetermined application.

The data learning unit 1510 according to an embodiment of the present disclosure may include a data acquisition unit 1511, a pre-processing unit 1512, a learning data selection unit 1513, a model learning unit 1514, and a model evaluation unit 1515.

The data acquisition unit 1511 may acquire data necessary for machine learning. Since much data is needed for the learning, the data acquisition unit 1511 may receive a plurality of texts and speeches corresponding to the texts.

The pre-processing unit 1512 may pre-process the acquired data such that the acquired data can be used for machine learning in order to determine the user's mental state. The pre-processing unit 1512 may process the acquired data in a predetermined format such that the model learning unit 1514 to be described below can use the data. For example, the pre-processing unit 1512 may morphologically analyze a text and a speech to acquire a morpheme embedding.

The learning data selection unit 1513 may select data necessary for learning from the pre-processed data. The selected data may be provided to the model learning unit 1514. The learning data selection unit 1513 may select data necessary for learning from the pre-processed data according to a predetermined criterion. Also, the learning data selection unit 1513 may select data according to the predetermined criterion through learning by the model learning unit 1514 to be described below.

The model learning unit 1514 may learn a criterion on which speech is to be output depending on the text based on the learning data. Also, the model learning unit 1514 may perform learning by using a learning model for outputting a speech according to a text as the learning data. In this case, the data learning model may include a pre-established model. For example, the data learning model may include a model pre-built by receiving basic learning data (e.g., a sample image).

The data learning model may be built in consideration of an application of the learning model, a purpose of the learning, computer performance of an apparatus, or the like. The data learning model may include, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), and Convolutional Neural Network (CNN) may be used as the data learning model. However, the present invention is not limited thereto.

According to various embodiments, when a plurality of pre-built data learning models are present, the model learning unit 1514 may determine a data learning model having a large correlation between the input learning data and the basic learning data as a data learning model to be learned. In this case, the basic learning data may be pre-classified for each data type, and the data learning model may be pre-built for each data type. For example, the basic learning data may be pre-classified according to various criteria such as a region where the learning data is generated, a time when the learning data is generated, the size of the learning data, the genre of the learning data, the creator of the learning data, the types of objects in the learning data, and the like.

Also, the model learning unit 1514 may train the data learning model using, for example, a learning algorithm including error back propagation or gradient descent.

Also, the model learning unit 1514 may learn the data learning model through, for example, supervised learning having the learning data as an input value.

Also, by self-learning the type of data necessary for situation determination without any supervision, the model learning unit 1514 may learn the data learning model through, for example, unsupervised learning that finds a criterion for the situation determination. Also, the model learning unit 1514 may learn the data learning model through, for example, reinforcement learning using feedback to whether the result of the situation determination according to the learning is correct.

Also, when the data learning model is learned, the model learning unit 1514 may store the learned data learning model. In this case, the model learning unit 1514 may store the learned data learning model in a memory of an electronic apparatus including the data recognition unit 1520. Alternatively, the model learning unit 1514 may store the learned data learning model in a memory of a server connected to an electronic apparatus over a wired or wireless network.

In this case, for example, instructions or data associated with at least one another element of the electronic apparatus may also be stored in the memory where the learned data learning model is stored. Also, the memory may store software and/or a program. The program may include, for example, a kernel, middleware, an application, an application programming interface (API), and/or an application program (or an "application").

The model evaluation unit 1515 inputs evaluation data to the data learning model. When a result output from the evaluation data does not satisfy a predetermined criterion, the model evaluation unit 1515 may allow the model learning unit 1514 to perform learning again. In this case, the evaluation data may include data predetermined to evaluate the data learning model.

For example, the model evaluation unit 1515 may evaluate that the predetermined criterion is not satisfied when the number or ratio of pieces of the evaluation data which are incorrect for a recognition result with respect to a result of the evaluation data by the learned data learning model exceeds a predetermined threshold. For example, when the predetermined criterion is defined as a ratio of 2% and the learned data learning model outputs incorrect recognition results for more than 20 pieces of evaluation data out of a total of 1000 pieces of evaluation data, the model evaluation unit 1515 may evaluate that the learned data learning model is not appropriate.

Meanwhile, when a plurality of learned data learning models are present, the model evaluation unit 1515 may evaluate whether each of the learned video learning model satisfies a predetermined criterion and may determine a model satisfying the predetermined criterion as a final data learning model. In this case, when a plurality of models satisfy the predetermined criterion, the model evaluation unit 1515 may determine any predetermined model or a predetermined number of models as the final data learning model in order of highest to lowest evaluation scores.

Meanwhile, at least one of the data acquisition unit 1511, the pre-processing unit 1512, the learning data selection unit 1513, the model learning unit 1514, or the model evaluation unit 1515 in the data learning unit 1510 may be manufactured in the form of at least one hardware chip and mounted on an electronic apparatus. For example, at least one of the data acquisition unit 1511, the pre-processing unit 1512, the learning data selection unit 1513, the model learning unit 1514, or the model evaluation unit 1515 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1511, the pre-processing unit 1512, the learning data selection unit 1513, the model learning unit 1514, and the model evaluation unit 1515 may be mounted on any electronic apparatus or separate electronic apparatuses. For example, some of the data acquisition unit 1511, the pre-processing unit 1512, the learning data selection unit 1513, the model learning unit 1514, and the model evaluation unit 1515 may be included in an electronic apparatus, and the others may be included in a server.

Also, at least one of the data acquisition unit 1511, the pre-processing unit 1512, the learning data selection unit 1513, the model learning unit 1514, or the model evaluation unit 1515 may be implemented as a software module. When at least one of the data acquisition unit 1511, the pre-processing unit 1512, the learning data selection unit 1513, the model learning unit 1514 or the model evaluation unit 1515 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The data recognition unit 1520 according to an embodiment of the present disclosure may include a data acquisition unit 1521, a pre-processing unit 1522, a recognition data selection unit 1523, a recognition result provision unit 1524, and a model update unit 1525.

The data acquisition unit 1521 may acquire a text necessary to output a speech. On the contrary, the data acquisition unit 1521 may acquire a speech necessary to output a text. The pre-processing unit 1522 may pre-process the acquired data such that the data acquired to output the speech or text can be used. The pre-processing unit 1522 may process the acquired data in a predetermined format such that the recognition result provision unit 1524 to be described below can use the data acquired to output the speech or text.

The recognition data selection unit 1523 may select data necessary to output the speech or text from the pre-processed data. The selected data may be provided to the recognition result provision unit 1524. The recognition data selection unit 1523 may select all or some of the preprocessed data according to a predetermined criterion for outputting the speech or text. Also, the recognition data selection unit 1523 may select data according to the predetermined criterion through learning by the model learning unit 1514.

The recognition result provision unit 1524 may output a speech or text by applying the selected data to the data learning model. The recognition result provision unit 1524 may apply the selected data to the data learning model by using the data selected by the recognition data selection unit 1523 as an input value. Also, the recognition result may be determined by the data learning model.

The model update unit 1525 may enable the data learning model to be updated based on the evaluation of the recognition result provided by the recognition result provision unit 1524. For example, the model update unit 1525 may enable the model learning unit 1514 to update the data learning model by providing the recognition result provided by the recognition result provision unit 1524 to the model learning unit 1514.

Meanwhile, at least one of the data acquisition unit 1521, the pre-processing unit 1522, the recognition data selection unit 1523, the recognition result provision unit 1524, or the model update unit 1525 in the data recognition unit 1520 may be manufactured in the form of at least one hardware chip and mounted on an electronic apparatus. For example, at least one of the data acquisition unit 1521, the pre-processing unit 1522, the recognition data selection unit 1523, the recognition result provision unit 1524, or the model update unit 1525 may be manufactured in the form of an AI-dedicated hardware chip or a portion of a conventional general-purpose processor (e.g., a CPU or an application processor) or a graphics processor (e.g., a GPU) and thus may be mounted on various electronic apparatuses that have been described above.

Also, the data acquisition unit 1521, the pre-processing unit 1522, the recognition data selection unit 1523, the recognition result provision unit 1524, and the model update unit 1525 may be mounted on any electronic apparatus or separate electronic apparatuses. For example, some of the data acquisition unit 1521, the pre-processing unit 1522, the recognition data selection unit 1523, the recognition result provision unit 1524, and the model update unit 1525 may be included in an electronic apparatus, and the others may be included in a server.

Also, at least one of the data acquisition unit 1521, the pre-processing unit 1522, the recognition data selection unit 1523, the recognition result provision unit 1524, and the model update unit 1525 may be implemented as a software module. When at least one of the data acquisition unit 1521, the pre-processing unit 1522, the recognition data selection unit 1523, the recognition result provision unit 1524, or the model update unit 1525 is implemented as a software module (or a program module including instructions), the software module may be stored in a non-transitory computer-readable medium. Also, in this case, at least one software module may be provided by an OS or may be provided by a predetermined application. Unlike this, some of the at least one software module may be provided by an operating system (OS), and the others may be provided by a predetermined application.

The present disclosure has been particularly shown and described with reference to various embodiments thereof. It will be understood by those skilled in the art that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The embodiments of the present invention can be written as computer programs and can be implemented in general-use digital computers that execute the programs using a computer-readable recording medium. Examples of the computer-readable recording medium may include storage media such as magnetic storage media (e.g., ROMs, floppy disks, hard disks, etc.), optical recording media (e.g., CD-ROMs, DVDs, etc.), etc.

What is claimed is:

1. A method for multilingual text-to-speech synthesis, comprising:
   receiving an articulatory feature of a speaker regarding a first language;
   receiving an input text of a second language; and
   generating output speech data for the input text of the second language that simulates the speaker's speech by inputting the input text of the second language and the articulatory feature of the speaker regarding the first language to a single artificial neural network multilingual text-to-speech synthesis model,
   wherein the single artificial neural network multilingual text-to-speech synthesis model is generated by learning similarity information between phonemes of the first language and phonemes of the second language based on a first learning data of the first language and a second learning data of the second language,
   the first learning data does not include a language identifier for the first language, and
   the second learning data does not include a language identifier for the second language.

2. The method of claim 1, wherein the first learning data of the first language includes a learning text of the first language and learning speech data of the first language corresponding to the learning text of the first language, and the second learning data of the second language includes a learning text of the second language and learning speech data of the second language corresponding to the learning text of the second language.

3. The method of claim 1, further comprising:
   receiving an emotion feature of the speaker in the first language; and
   generating output speech data for the input text of the second language that simulates the speaker's speech and emotion by inputting the input text of the second language, the articulatory feature of the speaker regarding the first language, and the emotion feature to the single artificial neural network multilingual text-to-speech synthesis model.

4. The method of claim 1, further comprising:
   receiving a prosody feature of the speaker in the first language; and
   generating output speech data for the input text of the second language that simulates the speaker's speech and prosody by inputting the input text of the second language, the articulatory feature of the speaker regarding the first language, and the prosody feature to the single artificial neural network multilingual text-to-speech synthesis model.

5. The method of claim 4, wherein the prosody feature includes at least one of information on utterance speed, information on accentuation, information on voice pitch, or information on pause duration.

6. The method of claim 1, wherein receiving the articulatory feature includes:
   receiving an input speech of the first language; and
   extracting a feature vector from the input speech of the first language to generate the articulatory feature of the speaker regarding the first language.

7. The method of claim 6, wherein receiving the input text of the second language includes:
   converting the input speech of the first language into an input text of the first language; and
   converting the input text of the first language into an input text of the second language.

8. A non-transitory computer-recordable storage medium having recorded thereon a program comprising instructions for performing each step according to the method of claim 1.

9. A system for multilingual text-to-speech synthesis, comprising:
   a memory; and
   at least one processor connected to the memory and configured to execute at least one computer-readable program included in the memory,
   wherein the at least one computer-readable program includes instructions for:
   receiving an articulatory feature of a speaker regarding a first language;
   receiving an input text of a second language; and
   generating output speech data for the input text of the second language that simulates the speaker's speech by inputting the input text of the second language and the articulatory feature of the speaker regarding the first language to a single artificial neural network multilingual text-to-speech synthesis model,
   wherein the single artificial neural network multilingual text-to-speech synthesis model is generated by learning similarity information between phonemes of the first language and phonemes of the second language based on a first learning data of the first language and a second learning data of the second language, and the first learning data does not include a language identifier for the first language, and the second learning data does not include a language identifier for the second language.

* * * * *